United States Patent [19]
Heinrich

[11] Patent Number: 5,291,388
[45] Date of Patent: Mar. 1, 1994

[54] RECONFIGURABLE INVERTER APPARATUS FOR BATTERY-POWERED VEHICLE DRIVE

[75] Inventor: Theodore M. Heinrich, Murrysville, Pa.

[73] Assignee: Westinghouse Electric Corp., Pittsburgh, Pa.

[21] Appl. No.: 870,644

[22] Filed: Apr. 16, 1992

[51] Int. Cl.$^5$ .................................... H02M 7/5387
[52] U.S. Cl. ................................ 363/98; 363/132; 320/57
[58] Field of Search .................. 320/57; 363/98, 132

[56] References Cited

U.S. PATENT DOCUMENTS

| | | | |
|---|---|---|---|
| 3,044,023 | 7/1962 | Floyd | 363/133 |
| 3,339,080 | 8/1967 | Howald | 320/57 |
| 4,136,382 | 1/1979 | Ricci | 320/57 |
| 4,697,131 | 9/1987 | Schauder et al. | 318/762 |
| 4,876,635 | 10/1989 | Park et al. | 363/132 |
| 4,885,518 | 12/1989 | Schauder | 318/798 |
| 4,920,475 | 4/1990 | Rippel | 363/132 |
| 4,959,602 | 9/1990 | Scott et al. | 318/803 |
| 4,962,339 | 10/1990 | Schauder | 363/58 |
| 5,008,801 | 4/1991 | Glennon | 363/98 |
| 5,182,508 | 1/1993 | Schauder | 318/801 |

Primary Examiner—J. L. Sterrett

[57] ABSTRACT

An inverter apparatus for a battery-powered vehicle drive which is selectively operable in either a normal drive mode or an alternative battery-charging mode. In the drive mode, the inverter functions to invert DC from the vehicle's on-board storage batteries to a polyphase AC to power the vehicle drive motor. In the battery-charging mode, the inverter draws charging current from an external energy supply source and supplies it to the battery as a DC charging current. The apparatus is usable with external energy supply sources varying widely in voltage and frequency.

9 Claims, 4 Drawing Sheets

RECONFIGURABLE INVERTER APPARATUS FOR BATTERY-POWERED VEHICLE DRIVE

BACKGROUND OF THE INVENTION

1. Field of the Invention

This invention relates to an inverter apparatus for use in battery powered vehicle drives. More particularly, the invention relates to such an inverter apparatus which is selectively operable either to convert DC from a storage battery located on board the vehicle to supply a polyphase AC electric motor or alternatively to charge the battery from an external energy supply source.

2. Description of the Prior Art

The development of battery-powered vehicles for widespread use has presented a number of substantial technical challenges. Much of the effort to overcome these challenges has been concerned with increasing efficiency. This has made weight reduction a primary consideration. Also, the vehicle must be able to operate over a wide range of speed and torque requirements.

Some drive systems for battery-powered vehicles incorporate polyphase AC electric motors as the electro-mechanical energy converters. These drives are known to have relatively high efficiency as well as excellent control characteristics. When such motors are utilized, however, the battery voltage must be converted from DC to polyphase AC. Furthermore, in order for the motor to respond to instantaneous speed and torque requirements, the AC must be variable voltage and frequency. The mechanism for performing this conversion is typically a pulse-width modulated ("PWM") inverter. Such inverters are well known throughout the power electronics community.

No matter how efficient an electric vehicle is made, the storage batteries must inevitably be recharged. This has often required special external equipment. Thus, in order to increase the feasibility of these vehicles, it is desirable that the circuitry necessary to recharge the batteries be carried "on board." This allows the vehicle to be recharged from convenient external energy sources. Typical charging systems added to a vehicle, however, simply increase overall weight. Thus, improvement in convenience has been at the expense of weight which causes an increase in acceleration times and a reduction of vehicle range.

SUMMARY OF THE INVENTION

The invention provides an inverter apparatus for a battery-powered vehicle drive which is selectively operable in either a normal drive mode or an alternative battery-charging mode. In the drive mode, the inverter functions to invert DC from the vehicle's on-board storage batteries to a polyphase AC to power the vehicle drive motor. In the alternative battery-charging mode, the inverter draws charging current from an external energy supply source and supplies it to the battery as a charging current.

The inverter apparatus generally comprises a number of inverter poles equal to the total number of phase windings in the motor to be driven. In one presently preferred embodiment, the inverter has three poles in order to drive a three-phase motor. In an alternative embodiment, the inverter has six poles which may power a motor having a pair of separately excitable three-phase windings.

In order to reconfigure the inverter apparatus for use in the battery-charging mode, switching means are provided which change the electrical interconnection of some components. Specifically, switches disconnect AC terminals of two of the inverter poles from their respective motor phase windings and connect them to means supplying current from an external energy source. Additionally, the positive DC rail of the inverter is typically disconnected from the positive battery terminal. Charging current means are typically responsive to the switching means to selectively provide a current path from the AC terminal of a third pole to the cathode. Alternatively, a diode may be electrically connected serially in the current path from the third AC inverter terminal to the positive battery terminal to eliminate a mechanical switching device.

DETAILED DESCRIPTION OF PRESENTLY PREFERRED EMBODIMENTS

Figure 1:
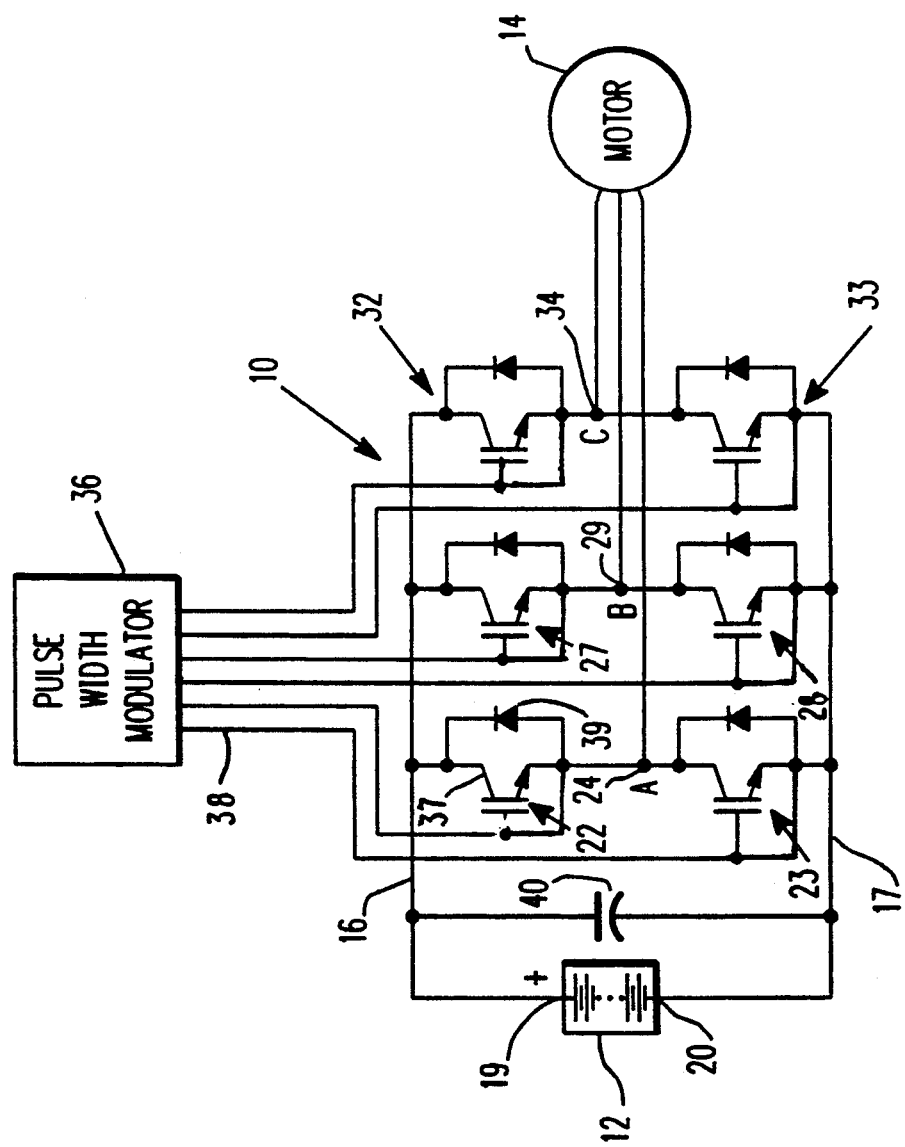
FIG. 1 is a schematic diagram of a prior art inverter apparatus used to invert DC supplied by a storage battery to three-phase AC for powering an AC electric motor.

FIG. 1 illustrates a PWM inverter apparatus 10 such as has been used in the prior art. Apparatus 10 functions generally to "invert" DC from battery 12 to the three-phase AC required by drive motor 14. Apparatus 10 generally comprises inverter poles A, B, and C which are wired across DC rails 16 and 17. Higher voltage (or "positive") rail 16 is electrically connected to positive terminal 19 of battery 12. Lower voltage (or "negative") rail 17 is connected to negative terminal 20.

Pole A has a pair of pole switches 22 and 23 serially connected between rails 16 and 17. AC terminal 24, which is connected to one of the phase windings of motor 14, is defined by the junction node between switches 22 and 23. Pole B also has a pair of serially connected pole switches 27 and 28 which define there between AC terminal 29. In a like manner, switches 32 and 33 of pole C define AC terminal 34.

Each of the pole switches has a semiconductor switching element which is gated by firing signals from pulse-width modulator 36. Typically, the semiconductor switching element may be an insulated gate bipolar transistor (IGBT) such as IGBT 37 of pole switch 22. Each IGBT has two control terminals—one on the gate and another on the emitter. When the gate is positive with respect to the emitter, the IGBT is "on." When the gate is negative with respect to the emitter, the IGBT is "off." Thus, firing signal lines, such as line 38, are actually two wire lines. Each switch further comprises an anti-parallel diode, such as diode 39, wired across the respective switching element. Capacitor 40 is provided to filter harmonics generated by any nonlinearities in the switching characteristics of the poles.

Inverter 10 thus configured is a three-phase bridge which rapidly applies the battery voltage in alternate polarities, or zero volts, to approximate a low-frequency waveform. Since pulse-width modulator 36 has the ability to change the characteristics of the firing signals based on demanded speed and torque conditions, PWM inverters such as apparatus 10 are often used where the drive motor is subject to closed-loop control.

An alternative inverter apparatus utilizing only a pair of poles may be constructed which is capable of driving a three-phase motor. Instead of a single capacitor 40, the two pole embodiment utilizes a pair of serially connected capacitors. The node between the two capacitors defines a third AC terminal.

PWM inverters are known to have the capability to operate with power flow of either polarity. When the IGBT of a particular pole switch is "on," current can flow in either direction. This is because current can flow in one direction through the IGBT or in the other direction through the anti-parallel diode. However, when the IGBT is "off," the diode is blocked by the collector voltage appearing on the transistor. Since power is the product of voltage and current, the power can be of either polarity and depends on the relationship of the PWM inverter output voltage to the load. Thus, when it is desired, motor 14 can be used as a generator during braking to recharge the vehicles batteries. This known method of operation is referred to as the regenerative mode.

Figure 2:
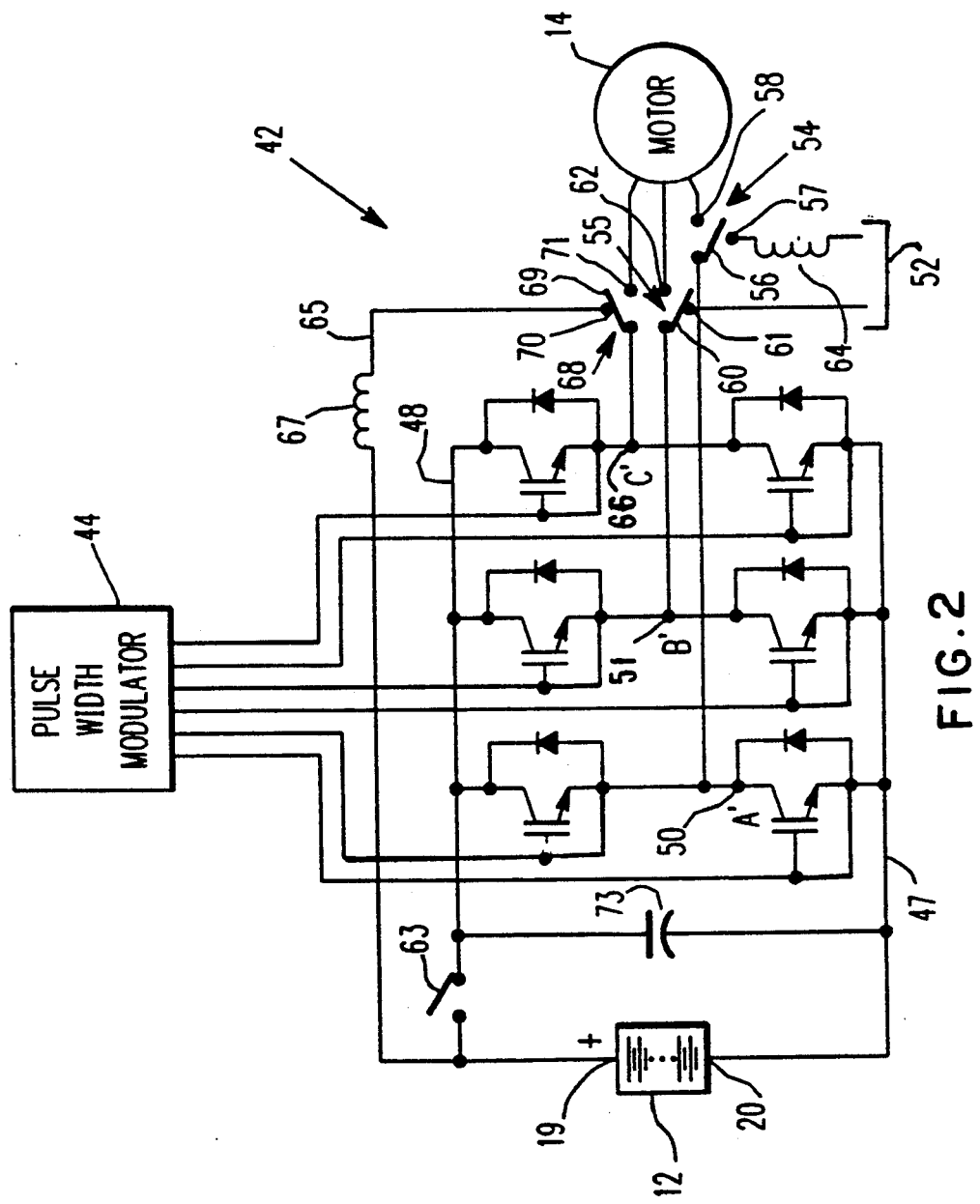
FIG. 2 is a schematic diagram of a presently preferred embodiment of the inverter apparatus of the invention.

The ability of a PWM inverter to accept reverse energy is utilized to an advantage in the present invention to permit charging of vehicle batteries from an external energy source. Referring to FIG. 2, switching means are provided to operate reconfigurable inverter apparatus 42 in either the normal drive mode or an alternative battery-charging mode. Inverter apparatus 42 comprises poles A', B', and C' which are constructed similarly to poles A, B, and C of apparatus 10. Pole switches of poles A', B', and C' are gated by firing signals from pulse width modulator 44.

In the alternative battery-charging mode shown, negative DC rail 47 remains connected to negative terminal 20. Positive DC rail 48, however, is preferably disconnected from positive terminal 19 as explained below. Appropriate source current means responsive to the switching means provide electrical connection to an external energy supply source 52 such as an AC mains source. This connection may be made by single-pole, double-throw (SPDT) switches 54 and 55, or the functional equivalent thereof. Switch 54 has an armature 56 electrically connected to AC terminal 50. Reverse-position contact 57 is electrically connected to receive energy from source 52. Normal-position contact 58 is connected to a phase winding of motor 14. Similarly, switch 55 has an armature 60 electrically connected to AC terminal 51. Reverse-position contact 61 is electrically connected to receive energy from source 52. Normal-position contact 62, on the other hand, is electrically connected to a second-phase winding of motor 14.

If switch 63 were closed as in the drive mode, battery 12 could be charged with poles A' and B' connected as shown. In this case, poles A' and B' could be controlled by pulse-width modulator 44 to function as a H-bridge converter drawing power from source 52 and delivering it to battery 12. In fact, only one pole is actually required to deliver the charging current. However, two poles would generally be used in the case of an AC source to convert both the positive and negative half-waves of the source current.

There are no restrictions on the frequency of the external energy source. It can even be pure DC. The only restriction with switch 63 closed is that voltage of the external energy supply source 52 must never exceed the battery voltage. This will result in uncontrolled current flow from the source to the battery. This restriction may be a problem when battery 12 is heavily discharged, or when source 52 is of a high voltage, e.g., a 230 volt source charging a 200 volt battery. One solution to this problem is to insert an interposing impedance 64 between the source 52 and one of the poles. Impedance 64 can be resistive or reactive, but in either case it reduces the amount of power delivered from source 52 for a given current. In order, however, to fully control the charging current, the impedance must be varied over a wide range.

To overcome this limitation, charging current means may be provided which establish an electrical conducting path, such as path 65, between AC terminal 66 and positive terminal 19. Impedance 67 functions to suppress harmonics in the charging current. Such connection may be made by SPDT switch 68. Switch 68 has an armature 69 which contacts reverse-position contact 70 as shown when apparatus 42 is in the alternative battery-charging mode. In the drive mode, armature 69 makes electrical connection with normal position contact 71. Additionally, switch 63 is opened such that DC rail 48 is no longer constrained to be the same as the potential of battery 12. Thus, it can assume a potential which is greater than the peak of source 52. Pole C' can then operate as a single-pole chopper, drawing current pulses from capacitor 73 charged to a higher voltage and delivering them to battery 12 at a lower voltage. The charging current delivered to the battery may thus be controlled irrespective of the ratio of the voltage of source 52 to the voltage of battery 12. The only limits are those imposed by the physical construction of the apparatus components. An electric vehicle incorporating inverter 42 can have its batteries recharged at virtually any standard single-phase power source whether it be at 110 or 220 volts. The standard 60 Hertz frequency, as well as virtually any other frequency, can be accommodated. This greatly enhances the feasibility and utility of battery-powered vehicles.

Figure 3:
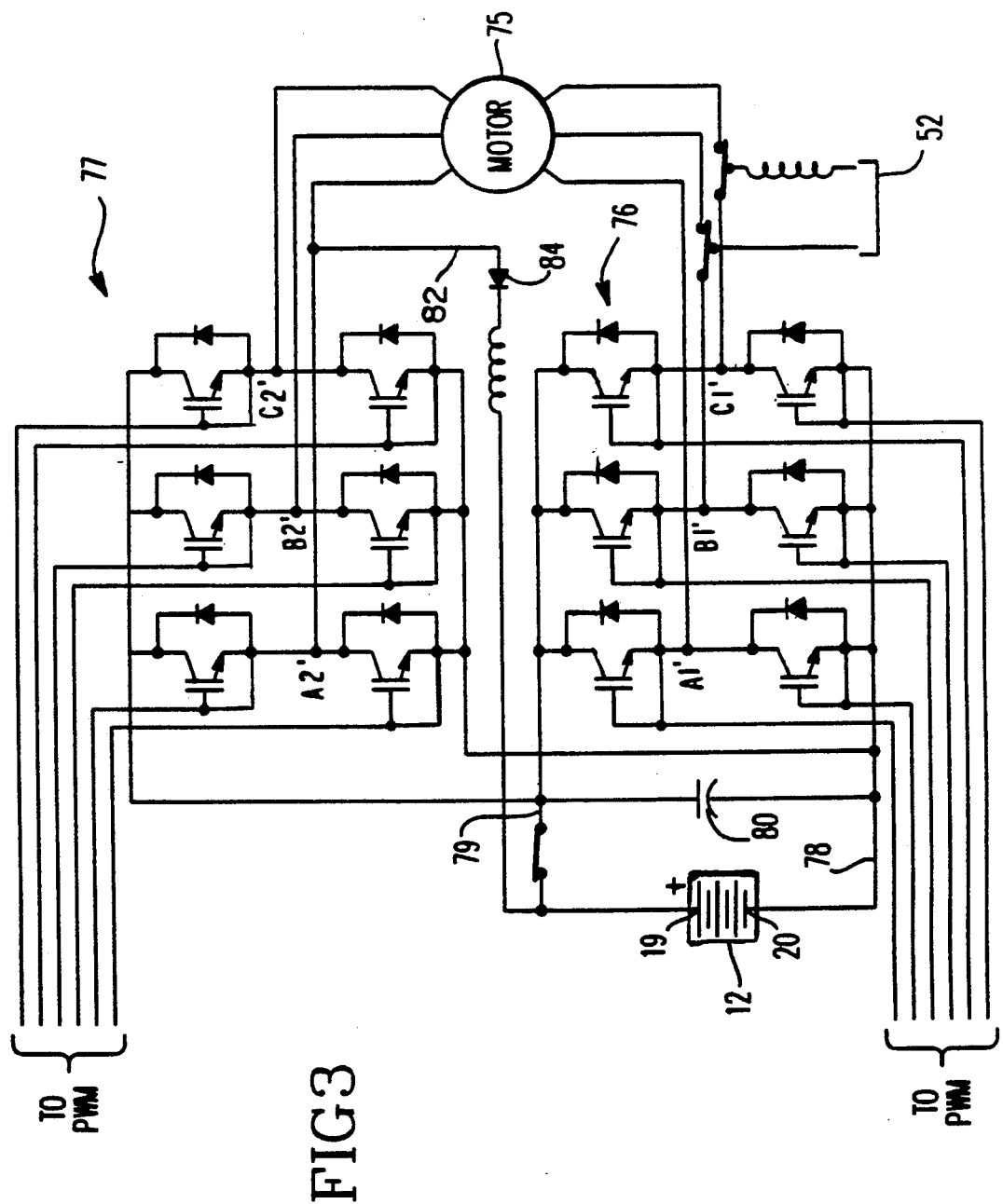
FIG. 3 is a schematic diagram of an alternative embodiment of the inverter apparatus of the invention.

Referring to FIG. 3, an alternative embodiment of the invention is illustrated for use with a motor 75 having separately excitable dual polyphase windings. In this embodiment, a pair of inverter bridges 76 and 77 share common DC rails 78 and 79. Inverter bridge 76 comprises poles A1', B1', and C1'. Similarly, inverter bridge 77 comprises inverter poles A2', B2', and C2'. The function of this embodiment is similar to that of the embodiment in FIG. 2. Here, however, poles A1' and B1' function to receive AC from AC mains 52 while pole A2' functions to deliver DC charging current from capacitor 80 to battery 12 via conducting path 82. This dividing of the functions between inverter bridges 76 and 77 is for convenience and is not necessary to the operation of this embodiment. Instead of the SPDT switch 68 of FIG. 2, the charging current means may utilize a serial diode reverse-biased with respect to battery 12. Thus, conducting path 82 is shown having a serial charging diode 84. Diode 84 prevents flow of current back into the AC terminal of pole A2, when the system is in the normal drive mode.

The invention thus provides a reconfigurable inverter apparatus which is selectively operable in a normal drive mode or an alternative battery-charging mode. A control scheme chosen to provide firing signals to the inverter poles should perform the following functions:

(1) maintain the battery-charging current at the demanded level; and (2) maintain the AC current drawn from mains 52 at a level just sufficient to keep inverter DC voltage slightly higher than the peak-charging voltage. A presently preferred control scheme thought to satisfy the above criteria illustrated in a concurrently filed application Ser. No. 07/870,643 by Colin D. Schauder Entitled "Reconfigurable AC Induction Motor Drive for Battery-Powered Vehicles", now U.S. Pat. No. 5,182,508. Such a scheme is conceptually illustrated in FIG. 4.

Actual charging current in path 65 is measured by charging current sensor 88. The measured actual charging current is then subtracted at differencing junction 89 from the externally specified charging current reference applied at line 90. The value of the signal applied at 90 is supplied by the system or user and has command of the charging rate. A charging current error signal thus produced is processed by current regulator 91. An output from regulator 91 is then used to operate pole switches of pole C' as a chopper in the previously described manner.

The voltage across capacitor 73, and hence across DC rails 47 and 48, is measured by a voltage sensor 93. This voltage is compared at differencing junction 94 with a demand level specified on line 95. The voltage error signal thus produced is processed by voltage regulator 96 and applied to differencing junction 97. The output of voltage regulator 96 commands the magnitude of the AC mains current from source 52 to a level required to maintain the voltage across rails 47 and 48 at a generally constant value.

Differencing junction 97 also receives an input from current sensor 98. An output from differencing junction 97 is processed by current regulator 99 and fed to pulse-width modulator 44. Phase and frequency information regarding source 52 is input to modulator 44 at line 100. Modulator 44 then controls the operation of poles A' and B' such that the voltage across capacitor 73 obtains a level to satisfy the charging current demand. In an AC system as shown, the current demand phase position should be set 180° out of phase with respect to the voltage at source 52. The current thus drawn is of virtually unity power factor.

Figure 4:
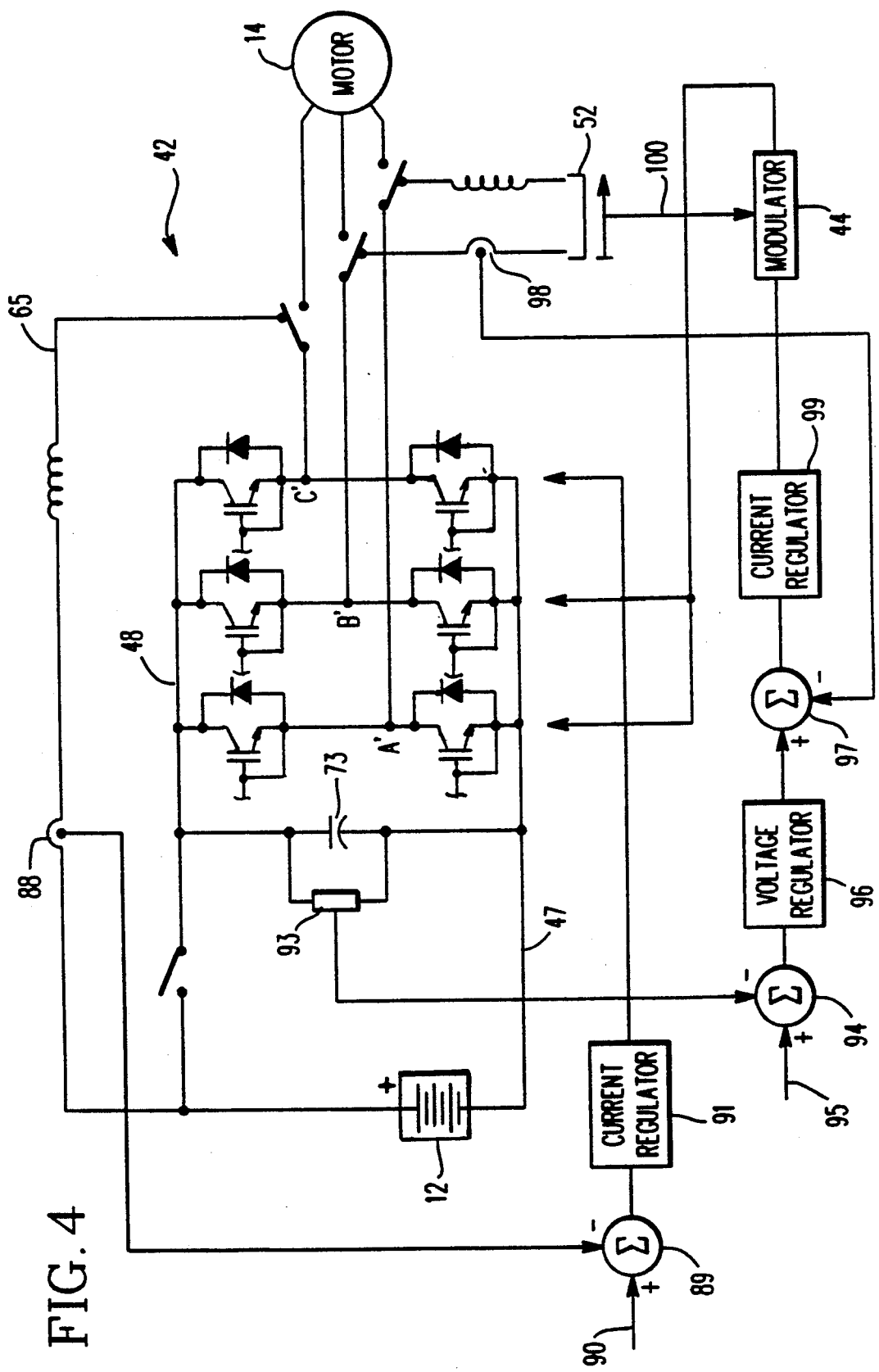
FIG. 4 is a diagrammatic view of a simplified scheme for providing gating signals to control the embodiment illustrated in FIG. 2.

While not the primary focus of the invention, it is interesting to note that the configuration shown in FIG. 4 can be used to provide AC power back to source 52. In this case, the electric vehicle can become an emergency power supply which could be used to power the AC system during power outages. Nevertheless, the invention provides a reconfigurable inverter apparatus which can be used to selectively recharge the on board storage batteries at virtually any location where external electrical energy is available. When the external source supplies AC, the current drawn by the inverter apparatus is essentially sinusoidal and is of unity power factor for greatest efficiency. The unity power factor and sinusoidal current drawn from the external energy source allows as much power as possible to be drawn from an AC outlet for a given voltage and current rating. This in turn shortens the time required to recharge a given battery.

Although certain preferred embodiments have been described and shown herein, it is to be understood that various other embodiments and modifications can be made within the scope of the following claims.

I claim:

1. A reconfigurable inverter apparatus usable with a battery-powered vehicle drive and selectively operable either to invert DC from at least one storage battery to supply a polyphase AC electric motor or alternatively to charge said battery from an external energy supply source, said apparatus comprising:

alternative mode switching means for providing selective electrical interconnection to operate said apparatus in a drive mode or an alternative battery-charging mode;

at least three inverter poles, each said pole having a pair of pole switches electrically connected serially between a pair of DC rails to form a node there between defining an AC terminal, each said pole switch having a semiconductor switching element with an antiparallel diode electrically connected thereacross;

at least one capacitor electrically connected across said pair of DC rails;

a first rail of said pair of DC rails electrically connectable to a first terminal of said battery;

a second rail of said pair of DC rails selectively electrically connectable in said drive mode to a second terminal of said battery, said second rail disconnected from said second terminal in said alternative battery charging mode;

source current means responsive to said switching means for use in said alternative battery-charging mode to provide electrical connection of an AC terminal of a first pole of said at least three inverter poles of said external energy supply source;

charging current means for use in said alternative battery-charging mode to provide an electrical conducting path from an AC terminal of a second pole of said at least three inverter poles to said second terminal; and wherein said switching means comprises the functional equivalent of: a single-pole, single-throw switch electrically connected between said second rail and a terminal connectable to said second terminal; a first single-pole, double-throw switch having a first armature contact electrically connected to said first pole, a first normal position contact electrically connectable to a first phase winding of said polyphase AC electric motor, and a first reverse position contact electrically connectable to said external energy supply source; a second single-pole, double-throw switch having a second armature contact electrically connected to said third pole, a second normal position contact electrically connectable to a second phase winding of said polyphase AC electric motor, and a second reverse position contact electrically connectable to said external energy supply source; and a third single-pole, double-throw switch having a third armature contact electrically connected to said second pole, a third normal position contact electrically connectable to a third reverse position contact electrically connectable to said terminal of said battery.

2. The apparatus of claim 1 wherein said charging current means includes an interposing impedance electrically connected serially in said electrical conducting path.

3. The apparatus of claim 1 wherein said charging current means includes an interposing charging diode electrically connected serially in said electrical conducting path, said charging diode reverse-biased with respect to said second terminal.

4. The apparatus of claim 1 wherein said semiconductor switching elements are IGBTs.

5. A reconfigurable inverter apparatus usable with a battery-powered vehicle drive and selectively operable either to invert DC from at least one storage battery to supply an AC electric motor having separately excitable dual polyphase windings or alternatively to charge said battery from an external energy supply source, said apparatus comprising:

alternative mode switching means for providing selective electrical interconnection to operate said apparatus in a drive mode or an alternative battery-charging mode;

a first inverter package to supply AC to a first of said dual polyphase windings and a second inverter package to supply AC to a second of said dual polyphase windings;

each said inverter package having at least two inverter poles, each said inverter pole having a pair of pole switches electrically connected serially between a pair of DC rails to form a node there between defining an AC terminal, each said pole switch having a semiconductor switching element with an antiparallel diode electrically connected thereacross;

a first rail of said pair of DC rails electrically connectable to a first terminal of said battery;

a second rail of said pair of DC rails selectively electrically connectable in said drive mode to a second terminal of said battery, said second rail disconnected from said second terminal in said alternative battery charging mode;

at least one capacitor electrically connected across said pair of DC rails;

source current means for use in said alternative battery-charging mode to provide selective electrical connection of an AC terminal of a first pole to said external energy supply source;

charging current means for use in said alternative battery-charging mode to provide an electrical conducting path from an AC terminal of a second pole to said second terminal;

wherein said source current means further provides selective connection in said alternative battery-charging mode of an AC terminal of a third pole to said external energy source; and wherein said switching means comprises the functional equivalent of: a single-pole, single-throw switch electrically connected between said second rail and a terminal connectable to said second terminal; a first single-pole, double-throw switch having a first armature contact electrically connected to said first pole, a first normal position contact electrically connectable to a first phase winding of said polyphase AC electric motor, and a first reverse position contact electrically connectable to said external energy supply source; a second single-pole, double-throw switch having a second armature contact electrically connected to said third pole, a second normal position contact electrically connectable to a second phase winding of said polyphase AC electric motor, and a second reverse position contact electrically connectable to said external energy supply source.

6. The apparatus of claim 5 wherein said first pole is in said first inverter package and said second pole is in said second inverter package.

7. The apparatus of claim 5 wherein said charging current means includes an interposing impedance electrically connected serially in said electrical conducting path.

8. The apparatus of claim 5 wherein said charging current means includes an interposing charging diode electrically connected serially in said electrical conducting path, said charging diode reverse-biased with respect to said second terminal of said battery.

9. The apparatus of claim 5 wherein said semiconductor switching elements are IGBTs.

* * * * *